May 21, 1946. M. GELFAND 2,400,863
ALGAECIDE
Filed Aug. 17, 1944
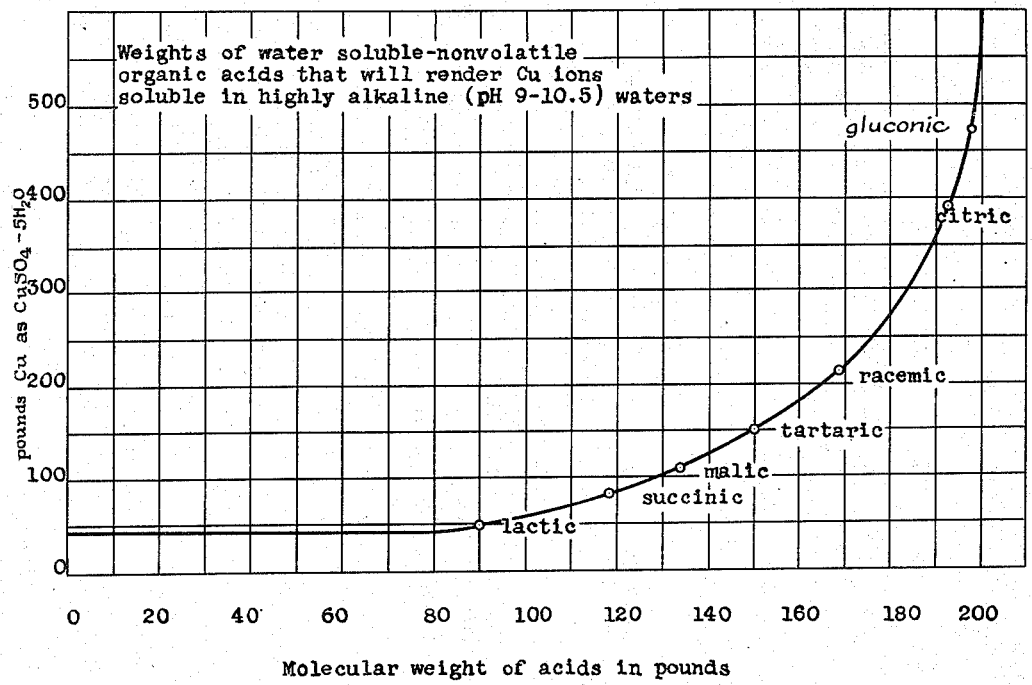
Inventor
Max Gelfand Patented May 21, 1946

2,400,863

UNITED STATES PATENT OFFICE 2,400,863

ALGAECIDE

Max Gelfand, Dallas, Tex.

Application August 17, 1944, Serial No. 549,953

4 Claims. (Cl. 167—16)

This invention relates to an algaecidal composition useful in the treatment of reservoirs, swimming pools, ponds from which water is derived, for industrial apparatus and processes, and in any other relations in which it is desired to destroy and prevent the growth of algae in water.

Copper sulphate and other copper salts have long been used as algaecides and are quite successful in waters below 7 or 8 in the pH scale, but they are not per se effective in the treatment of the more alkaline waters, for in such waters part or all of the copper ions are precipitated as insoluble copper hydroxide, and it is only copper ions in solution which destroys and prevents algae growth.

I have found and proved that if the alkaline waters are treated with a composition consisting of a water soluble inorganic copper salt in the presence of aliphatic hydroxy acids or salts of such acids or certain substances from which said acids may be derived, the copper ions are not precipitated, but are maintained in solution, and effective algaecidal results are thereby obtained. This composition is an efficient algaecide for all waters, regardless of their alkalinity.

The general object of the invention, therefore, is the provision of an algaecidal composition including a water soluble inorganic copper salt associated with an aliphatic hydroxy acid, salt of such acid or substance from which said acid may be derived, which keeps the copper ions of the copper salt in suspension in waters which are treated with said composition.

Other objects of the invention will appear as the following description proceeds:

In the drawing, the sole figure is a curve diagram showing quantitative relationship between some of the aliphatic hydroxy acids and an eligible copper salt in the formulation of the algaecidal composition.

The invention is predicated upon the prior knowledge that at least the following water soluble inorganic salts of copper have been employed as algaecides in treating water: Copper sulphate, copper nitrate, copper ammonium chloride, copper ammonium sulphate, copper bromate, copper chlorate, copper chloride, copper dichromate, copper fluosilicate; that these are effective as algaecides, some more so than others, in waters having a position below 8 in the pH scale, but are uniformly inefficacious in the treatment of waters above 8 in the pH scale.

It is well established that the ineffectiveness of the copper salts, per se, as algaecides in alkaline waters is due to the precipitation of copper as insoluble copper hydroxide. The toxic copper ion is thereby rendered inactive.

I have discovered by careful and extensive research that by associating aliphatic hydroxy acids, salts of such acids or a substance from which said acids are derived with a water soluble inorganic copper salt, the copper is prevented from being precipitated in alkaline waters, and therefore, substantially all of the toxic copper ions remain in solution in said waters.

The aliphatic hydroxy acids specifically tested with each of the hereinbefore mentioned copper salts are citric, tartaric, malic, succinic, lactic, racemic and gluconic. The following list of these aliphatic hydroxy acids shows the hydroxy groups in boldface type:

Gluconic acid —

$C_5H_6(OH)_5COOH$

Citric acid—

Hydroxytricarballyic acid
$COOH.CH_2.C(OH)COOH.CH_2COOH$

Tartaric acid—

Di-hydroxysuccinic acid $HOOC(CH\ OH)_2.COOH$

Racemic acid—

$[CH(OH).COOH]_2 + H_2O$

Malic acid—

Hydroxy succinic acid  $COOH.CH_2.CH(OH)COOH$

Lactic acid—

Alpha hydroxy propionic acid
$CH_3.CH(OH).COOH$ since all of these aliphatic hydroxy acids are derived in one way or another from sugars, this fact led to a test with sugar itself (sucrose) to determine whether or not it would behave in the same manner as the said organic acids. It was found that sucrose would do this, but not as effectively as the named acids or their corresponding salts. It is a basic principle of chemistry that only the stronger acids will react to liberate weaker acids from salts of said weaker acids, and since such acids as sulphuric, nitric, hydrochloric, and etc., which are radicles of the eligible copper salts, are stronger than any of the eligible non-volatile water soluble organic acids, no chemical action takes place between the copper salts and the associated organic acids, their relationship being insofar as it has been possible to ascertain, purely physical.

Again, if an aliphatic hydroxy acid such as citric, be added to an alkaline water containing soluble carbonates, since carbonic acid is a weaker acid than citric acid the carbonate salts will react with the citric acid to produce the citrate salt and liberate free carbon dioxide.

From this the deduction is logical and I have proved its accuracy by test, that not only may aliphatic hydroxy acids be used for the prevention of precipitation of the copper ions, but the corresponding water soluble salts of such acids may be used with equal success. For example, citric acid will produce sodium citrate with alkaline water; therefore, sodium citrate in the proportion that would be produced by the equivalent quantity of acid necessary to prevent precipitation of the copper ion in said alkaline water, may be substituted for the citric acid.

In carrying out the invention, it is desirable to employ the least necessary quantity by weight of the aliphatic hydroxy acid with a given weight of the copper salt which will prevent precipitation of the copper ions. It has been found, for example, that ½ part by weight of citric acid or 1 part by weight of tartaric acid, or 9 parts by weight of 22% lactic acid will prevent 1 part by weight of copper sulphate from precipitating in highly alkaline water.

In making up the subject algaecidal composition, it is preferred to bring the proper weight proportions of the copper salt and the selected aliphatic hydroxy acid or salt thereof together in aqueous solution, and to thoroughly mix the same. It is then in readiness as a treating agent for water. A dilution of the algaecidal composition with the water to be treated in such proportions as to provide 2.5 parts by weight of copper to 1,000,000 parts by weight of water is highly toxic to the simpler algae forms, regardless of the degree of alkalinity of the water.

Referring now to the sole figure of the drawing, the curve therein shown illustrates the quantities of aliphatic hydroxy acids which are necessary to prevent the copper ions in a given quantity of copper salt from precipitating in alkaline waters. For example, considering citric acid, the molecular weight in pounds of this acid is 192 pounds, and this weight of citric acid will prevent 385 pounds of copper as $CuSO_4.5H_2O$ from precipitating in alkaline waters. Copper sulphate is used in the example, since this salt of copper is most common and available. It can readily be seen that the quantity of copper ions, whether it be derived from copper sulphate or any other of the copper salts, would be the same that would be prevented from precipitation by the use of these aliphatic hydroxy acids.

The gluconic acid tested was a 50% solution. Of this solution, 8/10 pounds was found to render 1 pound of crystalline copper sulphate soluble in alkaline waters, or as is indicated in the curve of the drawing, 4/10 pounds of this acid in pure form will do the same work.

From this diagram can be readily ascertained the quantity by weight of any of the named aliphatic hydroxy acids it is necessary to bring into aqueous solution with a given weight of the copper salt in order to keep all of the copper ions in solution in alkaline waters.

In actual use in algae contaminated waters, there is a daily loss of copper from the subject algaecidal composition. This is not due to precipitation of insoluble copper hydroxide, but to reaction between the algae and the copper.

Two of the listed inorganic copper salts, copper ammonium sulphate and copper ammonium chloride are essentially soluble in alkaline waters, but will not remain so in waters which contain carbonates or bicarbonates of any alkaline earth metals such as sodium, potassium calcium, magnesium, and, etc., since the ammonia is liberated as $NH_3$ by the reaction of these carbonates, and the resulting copper is then in the form of copper sulphate and copper chloride which will precipitate as copper hydroxides unless the organic acids as described, are employed.

It is known that water soluble copper compounds, such as those disclosed in this application for patent are extremely lethal to water parasites such as cercaria and flukes of various types. However, the toxicity of such compounds is lost in waters of such alkalinity as cause the precipitation of the copper ions so that no effective means has heretofore been known for ridding highly alkaline waters of such parasites. By the use of such algaecidal composition, the copper remains in solution and the composition becomes an effective agent for the eradication of these water parasites.

The use of sodium citrate as a preventive of the precipitation of calcium carbonate from water has been known for a long time, both in the field of medicine in preventing the formation of kidney or bladder gravels, and in industry in the prevention of scale deposits in boilers, condensers, etc.

Therefore, in the treatment of alkaline drinking water reservoirs, the algaecidal composition employing sodium citrate may have the multipurposes of destroying algae and water parasites and producing a more healthful potable water, and in the treatment of industrial ponds it may be used both as an algaecide and a preventive of the deposit of calcium carbonate scale in the apparatus through which the water flows.

What I claim as my invention is:

1. Algaecide comprising a mixture of a water soluble inorganic copper salt and an inhibitor of reaction between said copper salt and an alkaline aqueous solution comprising a water soluble salt of an aliphatic hydroxy acid, the acid radical of the copper salt being stronger than that of the aliphatic hydroxy acid salt.

2. Algaecide comprising an aqueous solution of an inorganic salt of copper and a substance selected from the group consisting of aliphatic hydroxy acids, and the water soluble salts of said acids, the acid radical of the copper salt being stronger than the aliphatic hydroxy acid.

3. Algaecide comprising a mixture of a water soluble inorganic copper salt and an inhibitor of reaction between said copper salt and a water soluble alkali selected from the group consisting of aliphatic hydroxy acids, and water soluble salts of said acids, the acid radical of the copper salt being stronger than the aliphatic hydroxy acid.

4. Algaecide comprising an aqueous solution of an inorganic salt of copper, and sodium citrate, the acid radical of the copper salt being stronger than the acid radical of the sodium citrate.

MAX GELFAND.